E. BISS.
CULTIVATOR.
APPLICATION FILED APR. 17, 1908.
913,461.
Patented Feb. 23, 1909.
2 SHEETS—SHEET 1.
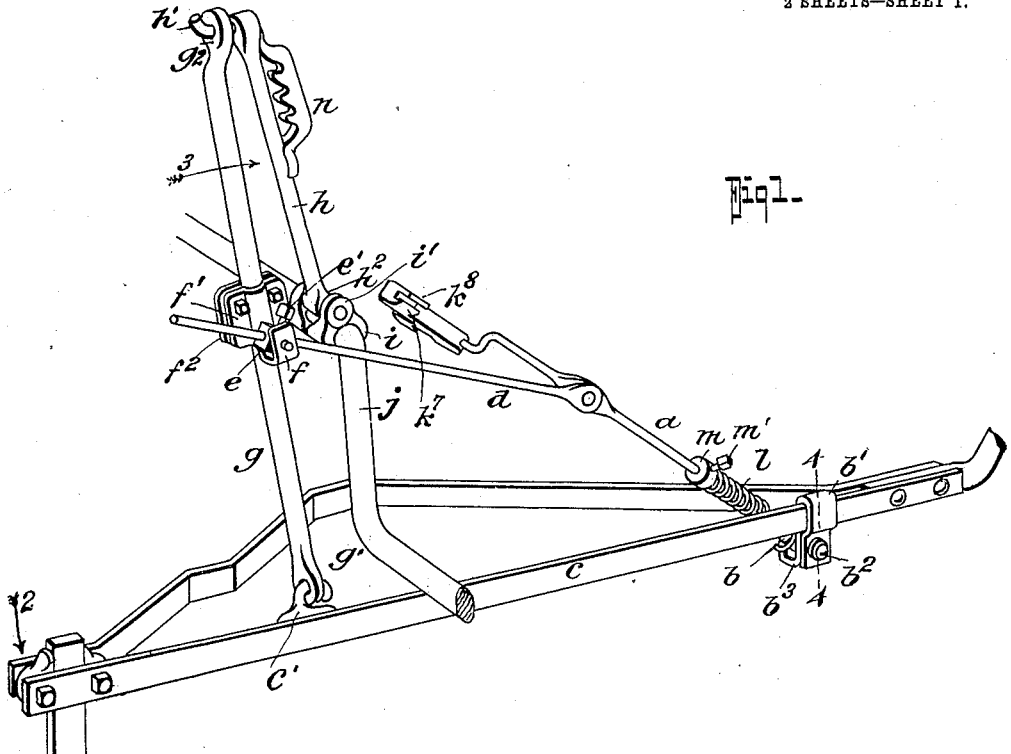
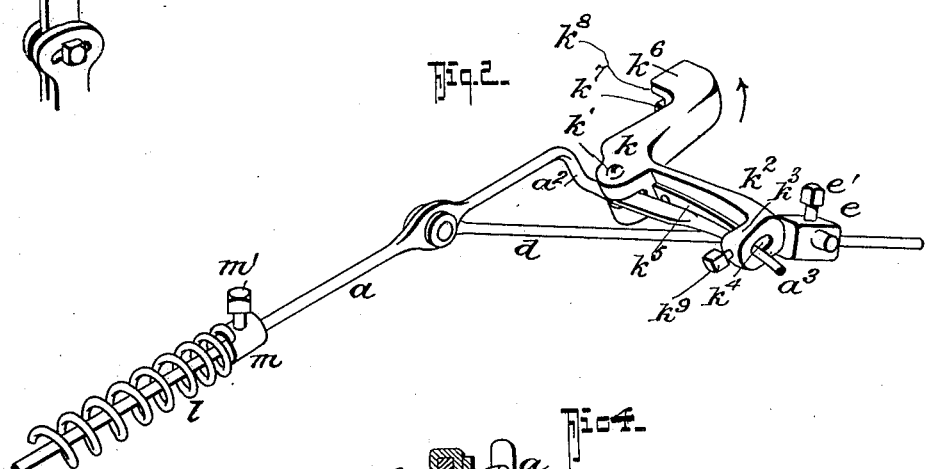
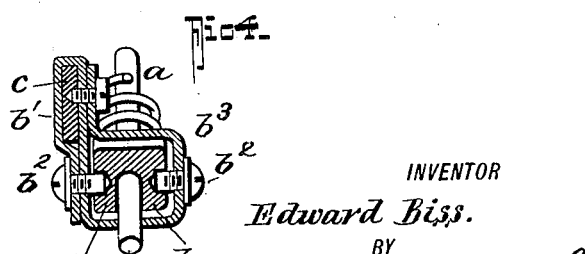
WITNESSES:
INVENTOR
Edward Biss.
BY
Fred G. Dieterich
ATTORNEYS.

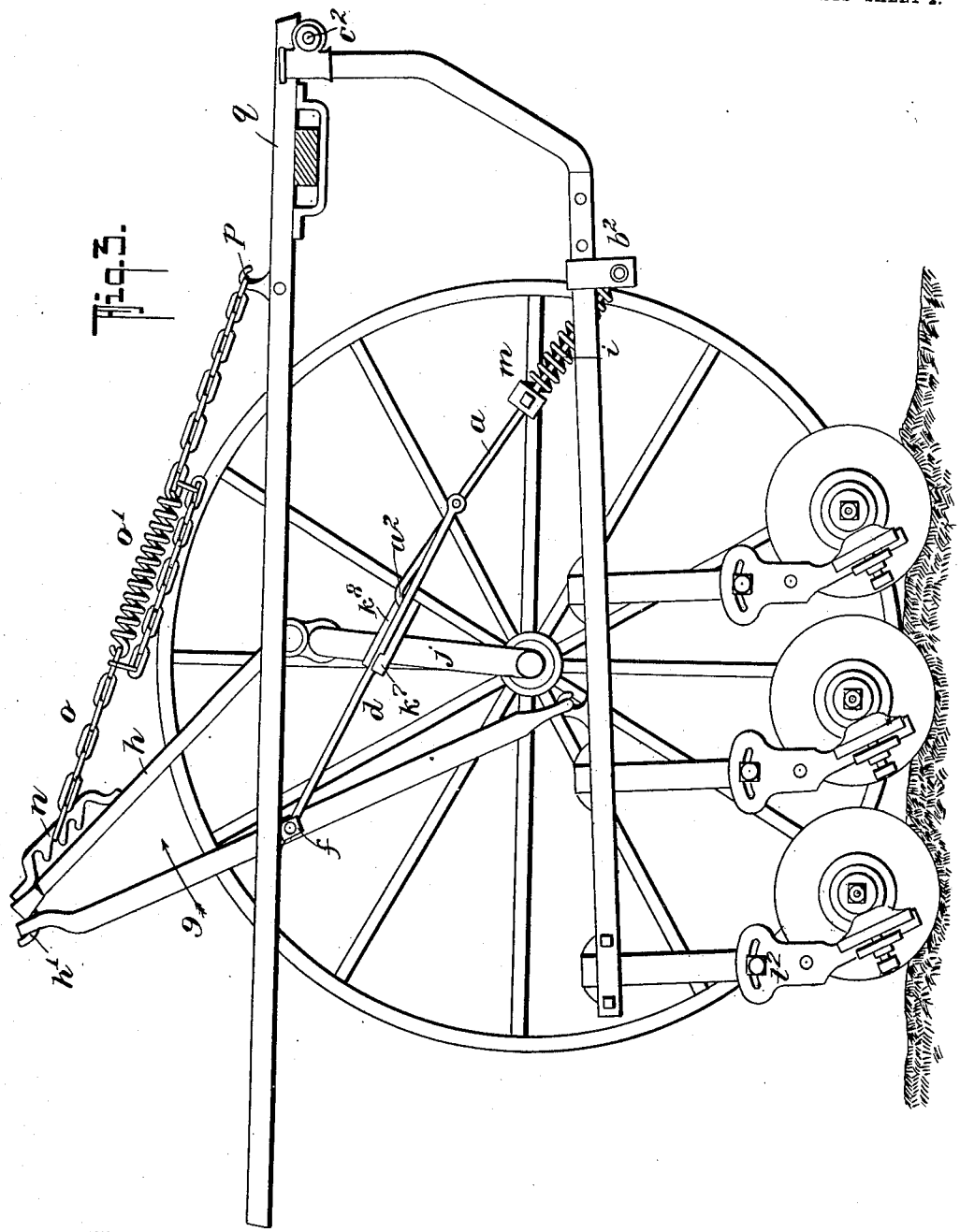

UNITED STATES PATENT OFFICE.

EDWARD BISS, OF NEAR SHERMAN, SOUTH DAKOTA.

CULTIVATOR.

No. 913,461.  Specification of Letters Patent.  Patented Feb. 23, 1909.

Application filed April 17, 1908. Serial No. 427,616.

*To all whom it may concern:*

Be it known that I, EDWARD BISS, residing near Sherman, in the county of Minnehaha and State of South Dakota, have invented certain new and useful Improvements in Cultivators, of which the following is a specification.

This invention, which relates generally to cultivators having gangs of plows or disks and means for holding the said plows or disks to their plow or elevated positions, more particularly has for its object to provide an improved means for holding the disk or plow gangs to their digging or cutting positions, operated under foot pressure, of a simple and inexpensive construction, and in which is included a means for locking the plow gang devices to their cutting positions, that automatically snaps into a locking position and which includes a foot actuating tripper device that releases the locking device, and a tension mechanism that automatically elevates the gang of plows or disks out of the ground when the said locking device is released.

In its subordinate features, my invention consists in certain details of construction and novel combination of parts, all of which will be hereinafter fully explained, specifically pointed out in the appended claims and illustrated in the accompanying drawings, in which:

Figure 1, is a perspective view of the parts that form the essential feature of my invention, the same being shown as combined with the plow beam and the arched axle. Fig. 2, is a perspective view of the spring presser and the locking devices coöperating therewith, hereinafter referred to. Fig. 3, is a longitudinal section of a portion of a cultivator having a gang of disk plows and my improvements applied, the latter being shown adjusted to a locked position for holding the gang of plows or disks down to the work. Fig. 4, is a cross section taken substantially on the line 4—4 on Fig. 1.

In the practical application of my invention, the same comprises generally a presser bar $a$, one end of which is slidably mounted in a journal box $b$, that is pivotally held in an adjustable bearing $b^3$ mounted on the cultivator beam $c$, the said bearing comprising a slotted head $b'$ that slides on the said beam $c$ and is adjustably held thereon by clamp screw pivots $b^2$, as clearly shown in Figs. 1 and 3.

To the rod $a$ is pivotally connected another rod $d$, the two rods $d$ and $a$ having a toggle like connection and the free end of the rod $d$ extends through a bearing box $e$ that is rockably mounted in a U-shaped bearing $f$ formed on a clamp member $f'$ that opposes a similarly shaped clamp member $f^2$ and which, together, with the said member $f^2$ is adjustably clamped upon the bar $g$, the lower end of which is pivotally connected at $g'$ to a hook $c'$ on the inner side of the beam $c$.

The rod $d$ is adjustably held in the block $e$ by means of a set screw $e'$, as clearly shown in Fig. 1.

The bar $g$ has its upper end formed with an apertured ear $g^2$ that engages the hook $h'$ on the upper end of another bar $h$, the lower end of which is hinged as at $h^2$ between the ears $i'$ of a bearing $i$ that is clamped on the arched axle $j$, the said bar $h$ being hinged so as to swing in the longitudinal plane of the beam $c$, the reasons for which will presently appear.

The upper end of the rod $a$ is bent inwardly at right angles as at $a^2$ and forms a bearing for a locking member $k$, presently again referred to, its outer end being reduced and forms a tripper member $a^3$, the purpose of which will presently appear.

The locking member $k$ is in the nature of a bell crank and is pivoted at $k'$ on the rod member $a^2$ as clearly shown in Fig. 2, by reference to which it will also be seen that the arm $k^2$ of the member $k$ extends in a plane substantially parallel with the member $a^2$ and has its outer end terminated in a head $k^3$ that is slotted as at $k^4$ to receive the outer or tripper end $a^3$ of the member $a^2$ and for normally forcing the lock $k$ outwardly in the direction indicated by the arrow on Fig. 2, the spring $k^5$ is secured to the arm $k^2$ that presses against the member $a^2$ as shown, the said spring serving to maintain the locking member $k$ so that its locking member $k^6$ projects in the longitudinal plane of the rod $a$ and in position to engage with the rod $d$ when the two rods are moved to their fullest extent, as shown in Fig. 3, the said head $k^6$ having a beveled lip $k^7$ and an overhanging lip $k^8$, the two lips being relatively so arranged that when the heads $a$ and $d$ are straightened to their fullest extent, the head $k^6$ moves toward the rod $d$ and the rod towards the head until the said head snaps into engagement with the head and becomes interlocked therewith, as shown in Fig. 3.

A set screw $k^9$ is provided in the head $k^3$ to regulate the spring tension to the presser rod $a$, a stout coil spring $l$ is mounted on the lower end of the said rod, one end of which engages with the bearing box $b^3$, and the other end of which engages a collar $m$ adjustably mounted on the rod $a$ and clamped thereon by a clamp screw $m'$, as clearly shown in Fig. 2.

By reason of connecting the gang plow beam $c$ with the rod $g$, hinging the rods to the said beam $c$ as shown, and pivotally connecting it with the rod $h$ that is hinged to the axle $j$, and joining the rods $d$ and $a$ in the manner described, it will be apparent that when pressure is applied to the outer end of the cultivator beam $c$ in the direction indicated by the arrow 2, Fig. 1 which in practice is done by the operator, when he sits on the seat of the cultivator pressing against the rear end of the cultivator beam with his foot until the bars $a$ and $d$ reach their extended or straight alining position, as shown in Fig. 3, the said bars $a$ and $d$ become interlocked and the members $g$, $h$ and $c$ are then held to their adjusted position with the plows or disks working in the ground, as shown in Fig. 3.

At the upper end of the bar $h$ is a rack like bail $n$, into any one of its notches of which can be fitted one end of a chain $o$ that has combined therewith a stout coil spring $o'$ so as to give the said chain a spring tension, the other end of the chain being fastened to a hook $p$, mounted on the upper or frame beam $q$ of the cultivator which is mounted on the axle, as clearly shown in Fig. 3, and to which the front end of the gang plow beam $c$ is pivotally connected as at $c^2$, see Fig. 3.

So long as the rods $a$ and $d$ are interlocked the gang plows will be held down to their work but should the operator desire that the plows be lifted from the work he can accomplish this almost instantly by pressing against the slotted member $k^2$ of the lock member $k$ sufficiently to cause the head $k^6$ to become disengaged from the rod $d$ and when this is done, the tension of the spring $o'$ from the chain $o$ will swing the bars $h$ and $g$ in the direction of the arrow 3, see Fig. 1, and thereby raise the gang beam $c$ up sufficiently to bring the disks or plows out of engagement with the ground.

From the foregoing, taken in connection with the accompanying drawings, it is believed the complete construction of my invention, the manner in which it operated, and its advantages will be readily understood by those skilled in the art to which it appertains.

It will be observed that the operation of moving the gang of plows into the operative position is quickly and positively effected by simply pressing with the foot down upon the rear end of the plow beam and in doing this, the said beam is automatically locked to such position by the members $d$ and $a$ and the locking devices that coöperate therewith. Furthermore, the plows may be as quickly released from the working position so as to be moved up from contact with the ground by simply pressing against the heel of the lock $k$ so that its locking head $k^6$ disengages the rod $d$ when the tension chain and spring $o$ comes into play, as before stated.

What I claim is:—

1. In a cultivator, in combination with the frame and the plow carrying beam pivotally connected at the front end to the frame; of means including a member pivotally connected at one end to the frame, another member pivotally connected to the plow beam, the two members being pivotally connected with each other, and a device mounted on the adjacent ends of the two members for automatically interlocking to hold the members extended when the plow beam is manually depressed.

2. The combination with the axle, the frame and the plow beam hung at the front end from the beam; of a presser rod slidably and pivotally connected to the beam, a bar hinged to the frame, another rod connected to the bar and pivotally joined with the presser rod, said presser rod having a snap lock for engaging the other rod when the two rods are swung down for locking the two rods to an alining extended position, for the purposes stated.

3. The combination with the axle, the framing mounted thereon and the plow carrying beam hung at the front end on the beam; of a bar hinged to the beam to swing in the longitudinal plane thereof, a means joined with the bar and the frame for normally swinging the bar forwardly and upwardly to lift the plow beam, toggle rods, one of which is fixedly connected to the hinged bar, the other of which has a slidable and pivotal connection with the plow beam under tension, and means on one of the rods for interlocking with the other rod when the two rods are straightened, for the purposes stated.

EDWARD BISS.

Witnesses:
L. A. HULETT,
M. J. BALDWIN.